United States Patent
Noguchi

(10) Patent No.: US 7,817,197 B2
(45) Date of Patent: Oct. 19, 2010

(54) OPTICAL BLACK CALIBRATION

(75) Inventor: Yasu Noguchi, Sunnyvale, CA (US)

(73) Assignee: MediaTek Singapore Pte Ltd, Singapore (SG)

( * ) Notice: Subject to any disclaimer, the term of this patent is extended or adjusted under 35 U.S.C. 154(b) by 1056 days.

(21) Appl. No.: 11/525,699

(22) Filed: Sep. 21, 2006

(65) Prior Publication Data

US 2008/0074513 A1 Mar. 27, 2008

(51) Int. Cl.
*H04N 9/64* (2006.01)
*H04N 3/14* (2006.01)

(52) U.S. Cl. ............... 348/243; 348/241; 348/298; 348/312; 348/320

(58) Field of Classification Search ............ 348/243
See application file for complete search history.

(56) References Cited

U.S. PATENT DOCUMENTS

| | | | | |
|---|---|---|---|---|
| 5,812,192 | A | 9/1998 | Ishigami et al. | 321/322 |
| 6,084,634 | A | 7/2000 | Inagaki et al. | 348/294 |
| 6,304,292 | B1 * | 10/2001 | Ide et al. | 348/243 |
| 6,452,634 | B1 | 9/2002 | Ishigami et al. | 348/322 |
| 6,791,607 | B1 | 9/2004 | Bilhan et al. | 348/243 |
| 6,829,007 | B1 | 12/2004 | Bilhan et al. | 348/243 |
| 7,098,950 | B2 * | 8/2006 | Yamamoto et al. | 348/243 |
| 7,417,669 | B2 * | 8/2008 | Kurane | 348/222.1 |
| 7,477,302 | B2 * | 1/2009 | Hisamatsu et al. | 348/243 |
| 7,545,418 | B2 * | 6/2009 | Beck et al. | 348/241 |
| 7,586,527 | B2 * | 9/2009 | Noguchi | 348/248 |
| 2001/0005226 | A1 * | 6/2001 | Muramatsu et al. | 348/304 |
| 2006/0262207 | A1 * | 11/2006 | Matsuoka | 348/243 |

OTHER PUBLICATIONS

Exar Product Specification, XRD9855/9856 XRD98L55/98L56 CCD Image Digitizers with CDS, PGA and 10-Bit A/D, Exar Corporation, Fremont, CA, Jul. 2001, 35 pages.

\* cited by examiner

*Primary Examiner*—Ngoc-Yen T Vu
(74) *Attorney, Agent, or Firm*—Imperium Patent Works; T. Lester Wallace; Zheng Jin

(57) ABSTRACT

Preview mode low-resolution readouts occur, and then a shutter button on a camera is pressed, which causes an image sensor cleanout operation to occur. Following the cleanout, a high-resolution readout occurs. As rows of sensor values are read, the first rows are rows corresponding to a pre-defined horizontally-extending shielded area. There are no valid area sensor elements to either side of the horizontally-extending area. Data values read from the horizontally-extending area are used to determine optical black (OB) values that are then used to adjust the valid area values read out of the image sensor in that same frame. The same OB values are used throughout the adjusting of the valid area values of the entire frame. No values from the preview readouts are used in the OB value determination, so there is a clean break between the preview mode OB level and the high-resolution capture OB level.

23 Claims, 12 Drawing Sheets

PREVIEW MODE - VERTICAL TRANSFER

VERTICAL TRANSFER REGISTER

CAPTURE MODE - VERTICAL TRANSFER

HORIZONTAL TRANSFER

HORIZONTAL TRANSFER

ONE FIELD READOUT

VERTICAL DRIFT COMPENSATION

OPTICAL BLACK CALIBRATION

TECHNICAL FIELD

The present disclosure relates to optical black (OB) level calibration of image sensor output data, and to analog front end (AFE) integrated circuits that perform OB level calibration.

BACKGROUND

FIG. 1 (Prior Art) is a simplified top-down diagram of an image sensor integrated circuit 1. Image sensor integrated circuit 1 includes a valid area 2 surrounded by a shielded area 3. Image sensor 1 includes a two-dimensional matrix of sensor elements (the sensor elements are not illustrated). Each sensor element outputs an analog data value indicative of the intensity of light detected by the sensor element. The analog data values are read out of the image sensor, pixel by pixel, row by row. The analog data values are converted into corresponding digital data values by subsequent processing circuitry referred to here as an analog-front-end (AFE). If a sensor element is not illuminated, then the data value output from image sensor 1 for that sensor element should correspond to a digital zero in the AFE. This is often not the case in an actual image sensor. The AFE therefore reads out the values from shielded sensor elements to obtain an average value that sensor elements will output if they are not illuminated. The resulting "optical black level" or "OB level" within the AFE is then typically subtracted from the sensor element data output values from the valid pixel area 2 so that the corrected data values will have a digital zero value under dark conditions. As a row of sensor elements is read, the values from shielded sensor elements that are located to a side of the valid area may be accumulated in the AFE to obtain the OB level value.

FIG. 2 (Prior Art) is a diagram of a subsequent processing circuit that receives values output from an image sensor, amplifies the values by a gain, and subtracts an OB level from the amplified valid pixel area values. The clamp level calculation circuit determines the OB level from values read from shielded side window optical black detection areas along the sides of the image sensor. The OB level is subtracted from offset adjusted and amplified values read out from the valid area of the image sensor. See U.S. Pat. No. 6,304,292 for more specific information on the circuit of FIG. 2.

FIG. 3 (Prior Art) is diagram that illustrates an operation of a conventional digital still camera. The still camera is used in a low-resolution preview mode to compose a digital photograph to be captured. The preview mode involves the mixing of values read from multiple sensor elements. A first gain is therefore used in the preview mode. When the user presses a shutter button at time T1 in order to take the digital photograph, the processing circuit causes the image sensor to carry out a cleanup operation to remove unwanted charge that might be left in the readout circuitry of the image sensor. Because pixel mixing will not occur in the subsequent high-resolution readout, the gain is changed. The feedback loop that performs OB level adjustment then stabilizes between times T2 and T3 in what is sometimes referred to as a "black level transition period". The time constant of the feedback loop is large because values from shielded sensor elements at the ends of many different sensor element rows may have to be processed in order to obtain an adequately accurate OB level.

When the feedback loop has stabilized (time T3), rows of values are read out from the image sensor as a sequence of three fields. As the rows of sensor values are read and processed, the OB level adjusting feedback loop operates and adjusts the OB level using the values read from the shielded areas to the sides of the valid area. There may be what are called "bad pixels" in these shielded side areas. A bad pixel typically outputs a constant value regardless of how the sensor element of the bad pixel is illuminated. If there are bad pixels in the optical black areas corresponding to one field and no such bad pixels in the optical black areas corresponding to other fields, then the OB level can be seen to jump significantly from field to field. This jumping in the OB level may be perceived as a flicker (sometimes appears as "line noise") if the series of interleaved fields is viewed repeatedly. Even if there are no bad pixels in the side optical black areas, the OB level may vary during image sensor readout as the feedback loop operates. An improved and faster circuit is desired.

SUMMARY

In one operational example of a novel camera involving a novel analog front end (AFE) integrated circuit, a series of preview mode low-resolution readout operations occurs. A shutter button on the camera is then pressed. The AFE responds by causing the image sensor to perform a cleanout operation. Following the cleanout operation, the AFE causes a high-resolution readout operation to occur. As rows of sensor element data values are read out of the image sensor in the high-resolution readout operation, the first row or rows are rows corresponding to a horizontally-extending shielded area. The boundaries of the horizontally-extending shielded area are defined by values stored in programmable registers within the AFE. There are no valid area sensor elements to either side of the horizontally-extending area.

The AFE uses data values read from the horizontally-extending area to determine optical black (OB) level values that the AFE then uses to adjust the valid area values subsequently read out of the image sensor in that same frame. In one example, at least one entire row of data values from the horizontally-extending shielded area is used to determine the OB level values used to adjust the very first valid area data value that is OB adjusted for that frame.

The AFE uses the same OB level values throughout the adjusting of the valid area data values of the entire frame. The same OB level values may, for example, be used to adjust valid area data values for each of three fields of the high-resolution frame being read out of the image sensor. Because the same OB level values are used throughout the adjustment of the valid area data values of the entire frame, there is no flicker (also called "line noise") due to jumps in OB level. No sensor element data output values from the prior preview mode readouts are used in the OB level value determination for the subsequent full-resolution capture, so there is a "clean break", between the preview mode OB level determination and the high-resolution capture OB level determination. There is no black level transition period as there is in some conventional AFEs. Rather, the cleanout operation is immediately followed by the readout of the first field of the high-resolution readout operation.

In one embodiment, the novel AFE includes a fully digital optical black level calibrator that is capable of carrying out the method set forth above. Analog data values read from the image sensor are digitized into a stream of digital values that is supplied to the optical black level calibrator. The optical black level calibrator receives the stream of digital input values and generates a corresponding stream of digital output values. The black level calibrator includes an accumulator, a programmable digital filter, a plurality of shadow registers for storing the determined OB level values, a plurality of registers for storing OB adjustment values, and a coordinator circuit. The coordinator circuit contains a plurality of programmable registers for holding values that define boundaries of the horizontally-extending shielded area and that define boundaries of the valid area. There are four color channels through the optical black level calibrator. The optical black level calibrator is configurable through a serial interface port of the AFE.

In one operating mode, the optical black level calibrator is configured to increase the OB levels used as successive rows of sensor element data values are processed within a field. At the end of each field, however, the OB level values are reset to be identical to the OB level values used at the beginning of the readout of the field. The increase in OB levels used counters effects of vertical drift seen in some image sensors.

In one novel aspect, an image sensor is powered up and horizontally-extending shielded area sensor values are read out of the image sensor during the readout of the first frame of image data after the power up. These horizontally-extending shielded area sensor values are used to determine an OB value. The OB value is then used to modify sensor values read from the valid area of the image sensor later in the readout of the very first frame. The readout of a frame of sensor values just for the purpose of obtaining an OB value is avoided, and an OB value is obtained from sensor data in the same frame as the actual valid area sensor data being black level adjusted. By reducing the amount of time that the sensor is powered up before the valid area sensors are read, the temperature rise of the image sensor due to the dissipation of electrical power is reduced. Keeping the temperature of the image sensor low reduces noise in the captured valid area sensor data that makes up the digital photograph.

Other embodiments and methods and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
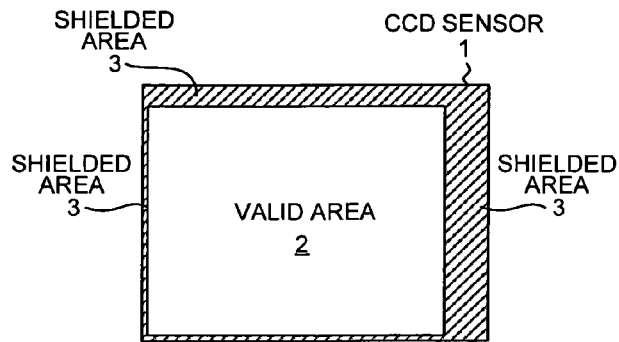
FIG. 1 (Prior Art) is a diagram of an image sensor.
Figure 2:
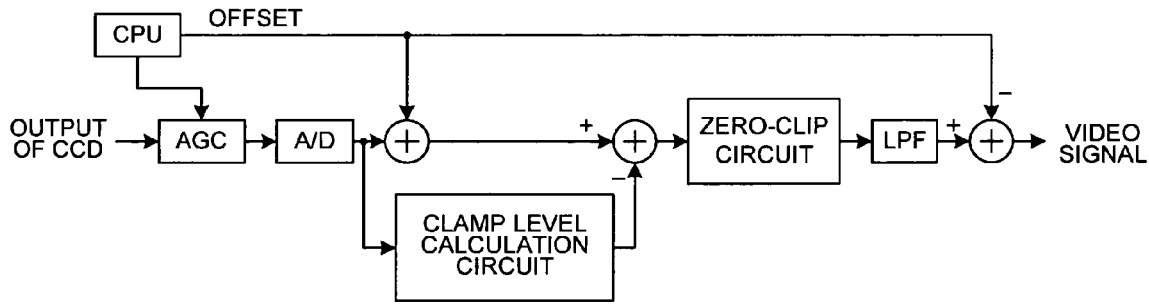
FIG. 2 (Prior Art) is a diagram of an example of a circuit that processes data values output from an image sensor.
Figure 3:
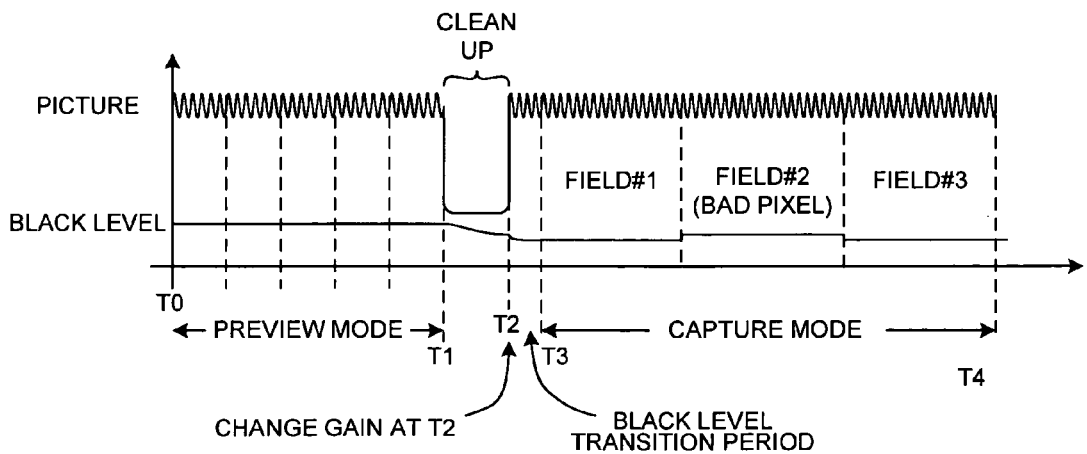
FIG. 3 (Prior Art) is a waveform diagram that illustrates an operation of a conventional camera.
Figure 4:
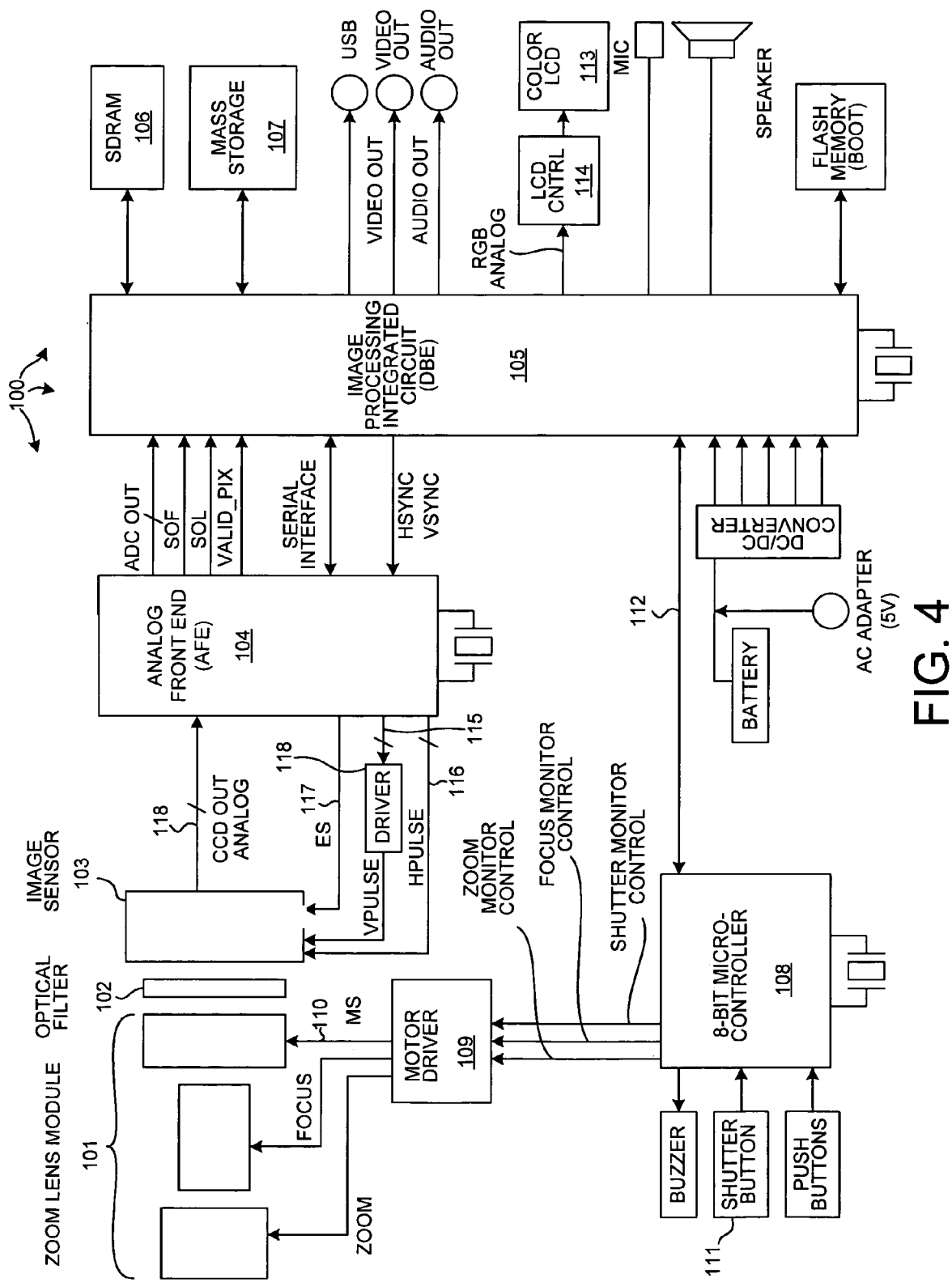
FIG. 4 is a simplified high level block diagram of a digital still camera 100 in accordance with one novel aspect.

FIG. 4 is a simplified high level block diagram of a digital still camera 100 in accordance with one novel 8, aspect. Camera 100 includes a zoom lens module 101, an optical filter 102, a three-field readout image sensor 103, an analog front end (AFE) integrated circuit 104, an image processing integrated circuit 105 (often referred to as a DBE or "digital back end"), an SDRAM buffer memory integrated circuit 106, and an amount of removeable mass storage 107 (for example, a removable FLASH memory card). Zoom lens module 101 is controlled by a microcontroller 108 via a motor driver 109. A mechanical shutter signal (MS) 110 is supplied by motor driver 109 in this way.

Microcontroller 108 detects whether the various buttons on the camera, including shutter button 111, are pressed. Microcontroller 108 reports the status of the shutter button back to image processing integrated circuit 105 via lines 112. Camera 100 has a color LCD display 113 which is usable to view images about to be captured as well as to view images already captured and menus and so forth. Image processing integrated circuit 105 controls LCD display 113 via LCD controller circuitry 114. AFE 104 supplies vertical transfer VPULSE signals, horizontal transfer HPULSE signals, and an electronic shutter signal ES via lines 115, 116 and 117, respectively, to image sensor 103 such that image sensor 103 outputs raw analog sensor data via lines 118 to AFE integrated circuit 104. Because AFE 104 cannot output a high voltage signal as required by CCD image sensor 103, a vertical driver circuit 118 is provided in the VPULSE signal line to increase voltage levels appropriately.

Figure 5:
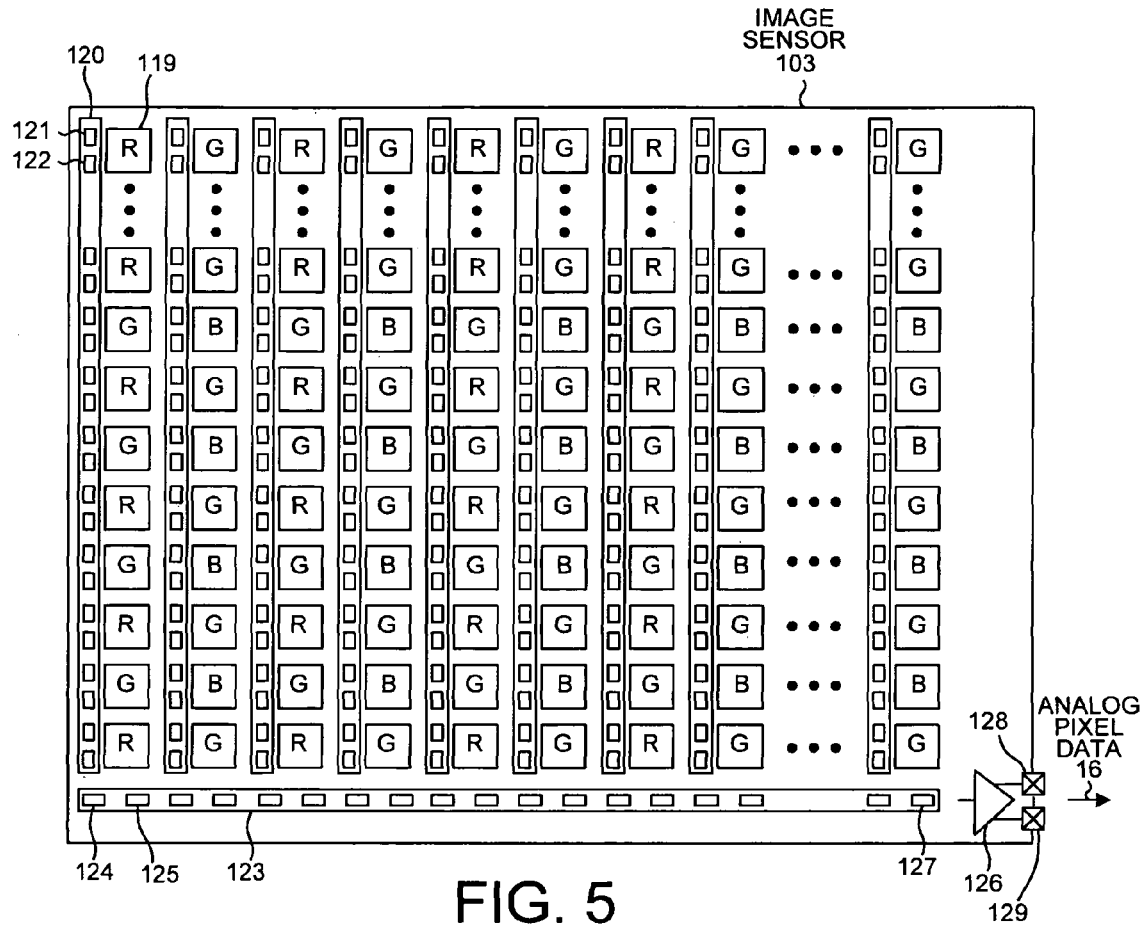
FIG. 5 is a simplified diagram of the image sensor within the camera of FIG. 4.

FIG. 5 is a more detailed block diagram of image sensor 103. In the present example, image sensor 103 is a charge coupled device (CCD) image sensor integrated circuit that involves a two-dimensional matrix (rows and columns) of photoelectric conversion sensor elements. Reference numeral 119 identifies the upper leftmost sensor element. Some of the sensor elements are for converting incident red light into associated charges that correspond to the intensities of red light detected. These sensor elements are the squares in FIG. 5 containing the capital letter "R". Others of the sensor elements are for converting green light into associated charges that correspond to the intensities of green light detected. These sensor elements are the squares in FIG. 5 containing the capital letter "G". Similarly, some of the sensor elements are for converting incident blue light into associated charges that correspond to the intensities of blue light detected. These sensor elements are the squares in FIG. 5 containing the capital letter "B". The sensor elements are organized in vertical columns. Associated with each vertical column is a structure referred to here as a vertical transfer line. Reference numeral 120 identifies the leftmost vertical transfer line. Each vertical transfer line involves a vertical transfer channel that is overlaid by a set of electrodes. The vertical transfer channel is a strip of doped semiconductor material. By placing an appropriate voltage on an electrode, the semiconductor material of the underlying portion of the vertical transfer channel can be depleted so as to form a capacitance that can store a charge. The vertical transfer line is therefore illustrated as being made up of a chain of vertical transfer portions. There are two such vertical transfer portions associated with each sensor element. Reference numerals 121 and 122 identify the upper two vertical transfer portions that are associated with sensor element 119. By placing appropriate voltages on the electrodes of the vertical transfer line in a particular sequence, a charge can be made to pass from vertical transfer portion to vertical transfer portion down the vertical transfer line.

Image sensor 103 of FIG. 5 also involves a horizontal transfer line 123. Horizontal transfer line 123 is of similar construction to the vertical transfer line 120 and is illustrated as being made up of a plurality of horizontal transfer portions. Reference numerals 124 and 125 identify the leftmost two horizontal transfer portions that are below vertical transfer line 120. By placing appropriate voltages on the electrodes of the horizontal transfer line in a particular sequence, a charge can be made to pass horizontally from horizontal transfer portion to horizontal transfer portion from left to right across horizontal transfer line 123 to an output driver 126. Output driver 126 converts the charge in the rightmost horizontal transfer portion 127 into a differential voltage signal that it drives onto differential output terminals 128 and 129. The differential signal is the image data output from image sensor 103.

Figure 6:
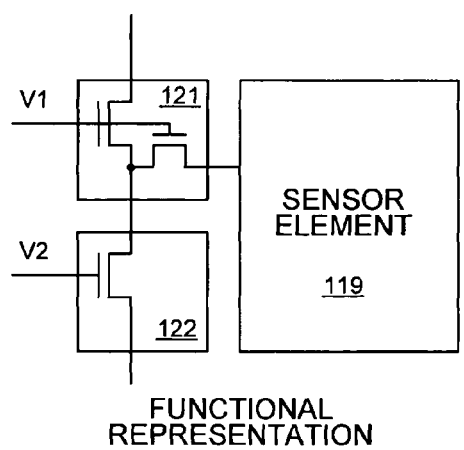
FIG. 6 is a functional diagram of two vertical transfer portions and their corresponding sensor element.

FIG. 6 is a simplified block diagram representation of vertical transfer portions 121 and 122 and sensor element 119 of FIG. 5.

Figure 7:
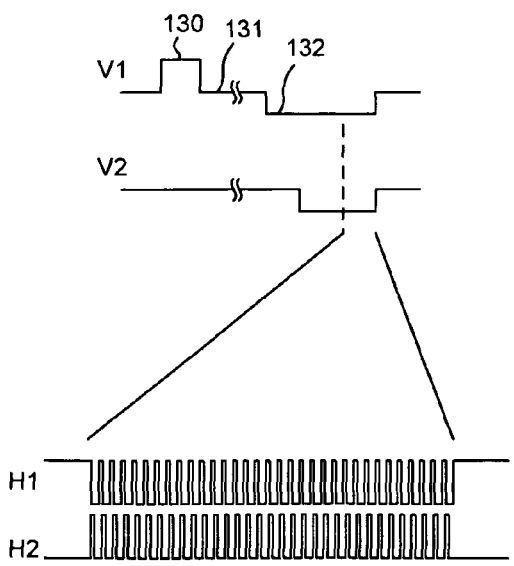
FIG. 7 is a simplified representation of the vertical transfer signals V1 and V2 and horizontal transfer signals H1 and H2 used to read data values out of the sensor of FIG. 5.

FIG. 7 is a simplified representation of the vertical transfer signals V1 and V2 and horizontal transfer signals H1 and H2 involved in reading out a frame of data captured by the two-dimensional matrix of sensor elements of FIG. 5. Light incident on sensor element 119 is converted into an electrical charge, the magnitude of which is indicative of the intensity of the incident light. The signal V1 can have three voltage levels, a high voltage, a middle voltage and a low voltage. Initially, as indicated in FIG. 7, signal V1 is pulsed to the high voltage 130. This causes the output of sensor element 119 to be coupled to vertical transfer portion 121. In the simplified representation of FIG. 6, the transistors within block 121 are conductive. Charge from sensor element 119 flows into and charges vertical transfer portion 121. Next, as illustrated in FIG. 7, the signal V1 returns to the middle voltage level 131, thereby decoupling sensor element 119 from vertical transfer portion 121. When the electrode over vertical transfer portion 121 is at the middle voltage level, vertical transfer portion 121 has a capacitance and can store a charge. Vertical transfer portion 121 therefore stores the charge received from sensor element 119. To transfer the charge (data) stored in vertical transfer portion 121 vertically down the vertical transfer line, the voltage levels of both the V1 and V2 signals are brought to the middle voltage level as indicated in FIG. 7. The two vertical transfer portions 121 and 122 are effectively merged so charge can flow between the two portions. Then, the voltage of signal V1 is reduced to the low voltage level 132. When the voltage is at the low voltage level, vertical transfer portion 121 no longer has a capacitance and can no longer store charge. All the charge that was stored in the combined vertical transfer portions 121 and 122 is transferred to vertical transfer portion 122. The charge is therefore seen to be transferred vertically. By appropriate manipulation of the voltages on the electrodes of the vertical transfer portions, charges can be transferred into the vertical transfer line and can then be swept down the vertical transfer line from portion to portion down to the horizontal transfer line 120. The H1 and H2 waveforms of FIG. 7 indicate that, for each shift of charges down the vertical transfer lines, the horizontal transfer line is shifted multiple times so that an entire line of charges is read out of the image sensor.

Image sensor 103 has a low resolution readout mode and a high resolution readout mode. In the low resolution readout mode, only data from a subset of the sensor elements is transferred out to the vertical transfer lines. Low resolution readout is used in the "preview" mode of operation of camera 100. When a user of camera 100 is preparing to take a picture using camera 100, low resolution image after low resolution image is read out from image sensor 103 in rapid succession. The resulting low resolution images are made to appear on LCD display 113. The user can look at the LCD display and determine what the camera would capture as a digital photograph if shutter button 111 were to be pressed. This is called "preview" mode operation.

In the high resolution readout mode, on the other hand, data from all the sensor elements is transferred out of image sensor 103 via the vertical and horizontal transfer line mechanism. When the user of camera 100 presses the shutter button, the camera 100 responds by capturing a high resolution image and the image data is read out of the image sensor 103 and into the AFE in a high resolution readout operation. This high resolution image data is the data that is processed by image processing integrated circuit 105 and that is then stored in mass storage 107 as a digital image file (for example, a JPEG file).

Figure 8:
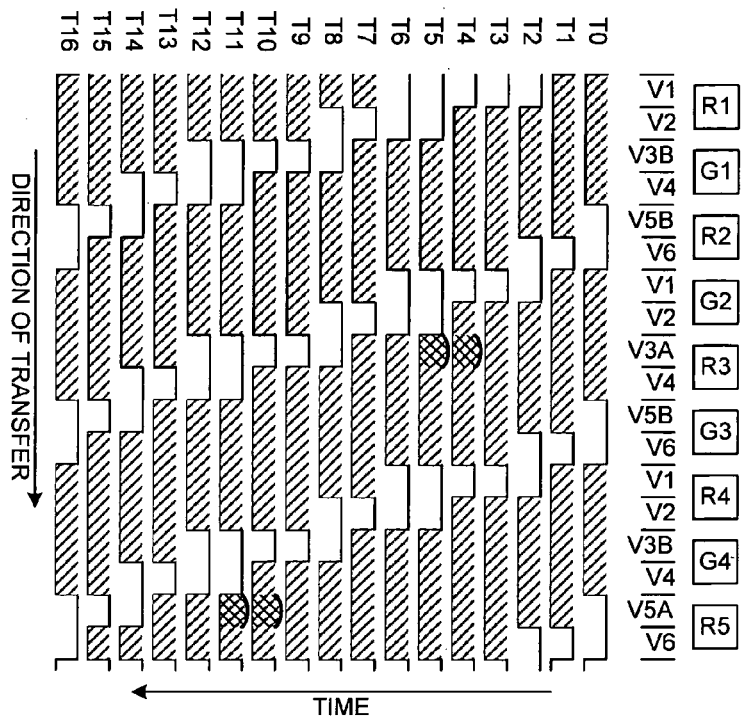
FIG. 8 is a potential diagram that illustrates the vertical transfer of data values (in the preview mode) in the image sensor of FIG. 5.

FIG. 8 illustrates a vertical transfer operation in the low resolution readout mode. The rightmost column of squares represents the sensor elements of the leftmost column of FIG. 5. The next column of numerals to the left of the column of squares is a list of signal names.

Figure 9:
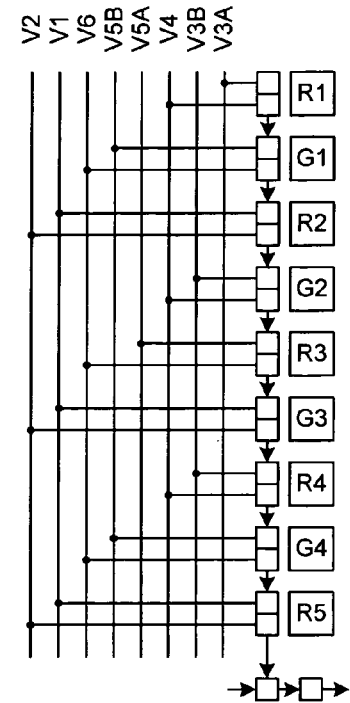
FIG. 9 is a diagram that illustrates how the signals are coupled to the various vertical transfer portions of the vertical transfer line of FIG. 8.

FIG. 9 is a simplified diagram that shows how the various signals of FIG. 8 are supplied to the various vertical transfer portions of the vertical transfer line 120. Pairs of vertical transfer portions in FIG. 9 operate as do the two vertical transfer portions described in connection with FIGS. 5-7.

In FIG. 8, the numerals T0 through T16 along the top of the diagram represent distinct times. FIG. 8 is what is called a "potential diagram". The cross-hatched representation at the intersection of the V1 signal and time T0 in the upper right corner of the diagram indicates that the vertical transfer channel at the location of the upper vertical transfer portion 121 is depleted (i.e., is deep) so it can store charge. Note that at time T0, all the upper four vertical transfer portions are illustrated in cross-hatching. The vertical transfer channel is said to be deep because the bottom of the transfer channel is farther to the left (left is down in the diagram of FIG. 8). These four vertical transfer portions are therefore coupled together and can hold a charge. This region of the vertical transfer channel can be considered a type of bucket that can store charge.

In FIG. 8, at time T0, the vertical transfer portions associated with image sensor R2 are shown as having no depletion regions. The bottom of the vertical transfer channel is illustrated to be at the surface of the sensor (the bottom of the vertical transfer channel is at the right—there is no cross-hatching). These two vertical transfer portions cannot store charge. They therefore serve to separate a first set of charge holding vertical transfer portions (of sensor elements R1 and G1) from a second set of charge holding vertical transfer portions (of sensor elements G2 and G3). By sweeping the location of the vertical transfer portions that are not capable of storing a charge downward, the location of the charge-storing portions is effectively moved downward so that any charge that these charge-storing portions hold is moved. In the diagram of FIG. 8, the transfer of charge from a sensor element into a vertical transfer portion is denoted with a double cross-hatched hump.

Note that charge from sensor element R3 is read into the vertical transfer line at times T4 and T5, and that this charge is swept down the vertical transfer line until it is in a set of coupled vertical transfer portions under sensor element R5 at times T10 and T11. At times T10 and T11, sensor element R5 is read into the vertical transfer line so that the charge read out of sensor element R5 adds to the charge previously read out of sensor element R3. Accordingly, one out of every four sensor elements is read, and the charges for pairs of the sensor elements that are read are added (i.e., "mixed") together.

Figure 10:
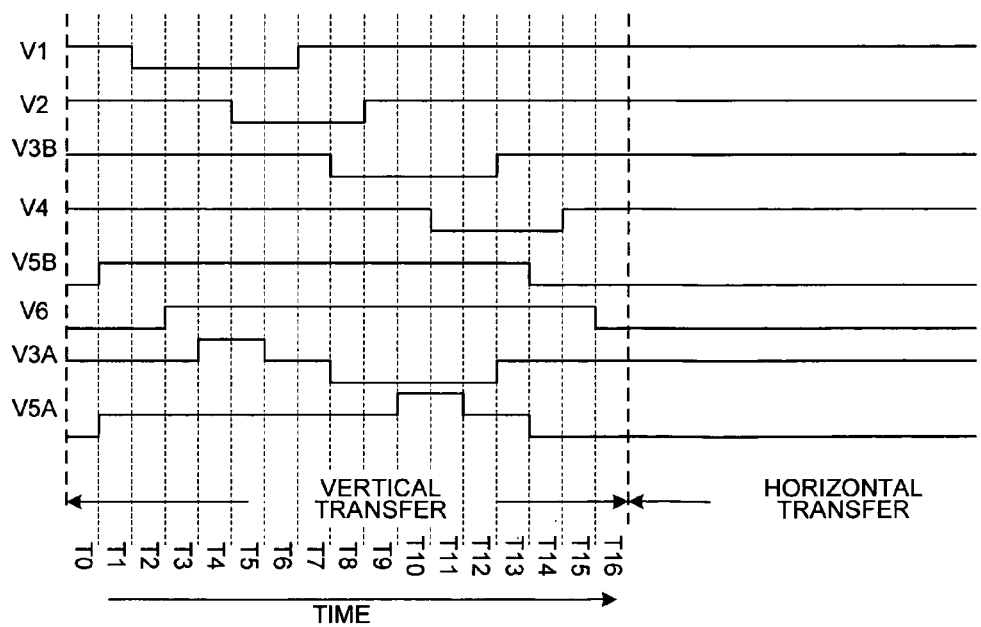
FIG. 10 is a diagram of signals that carry out the vertical transfer of FIG. 8.

FIG. 10 shows the waveforms of the vertical transfer signals V1, V2, V3B, V4, V5B, V6, V3A and V5A that cause the vertical readout illustrated in FIG. 8.

Figure 11:
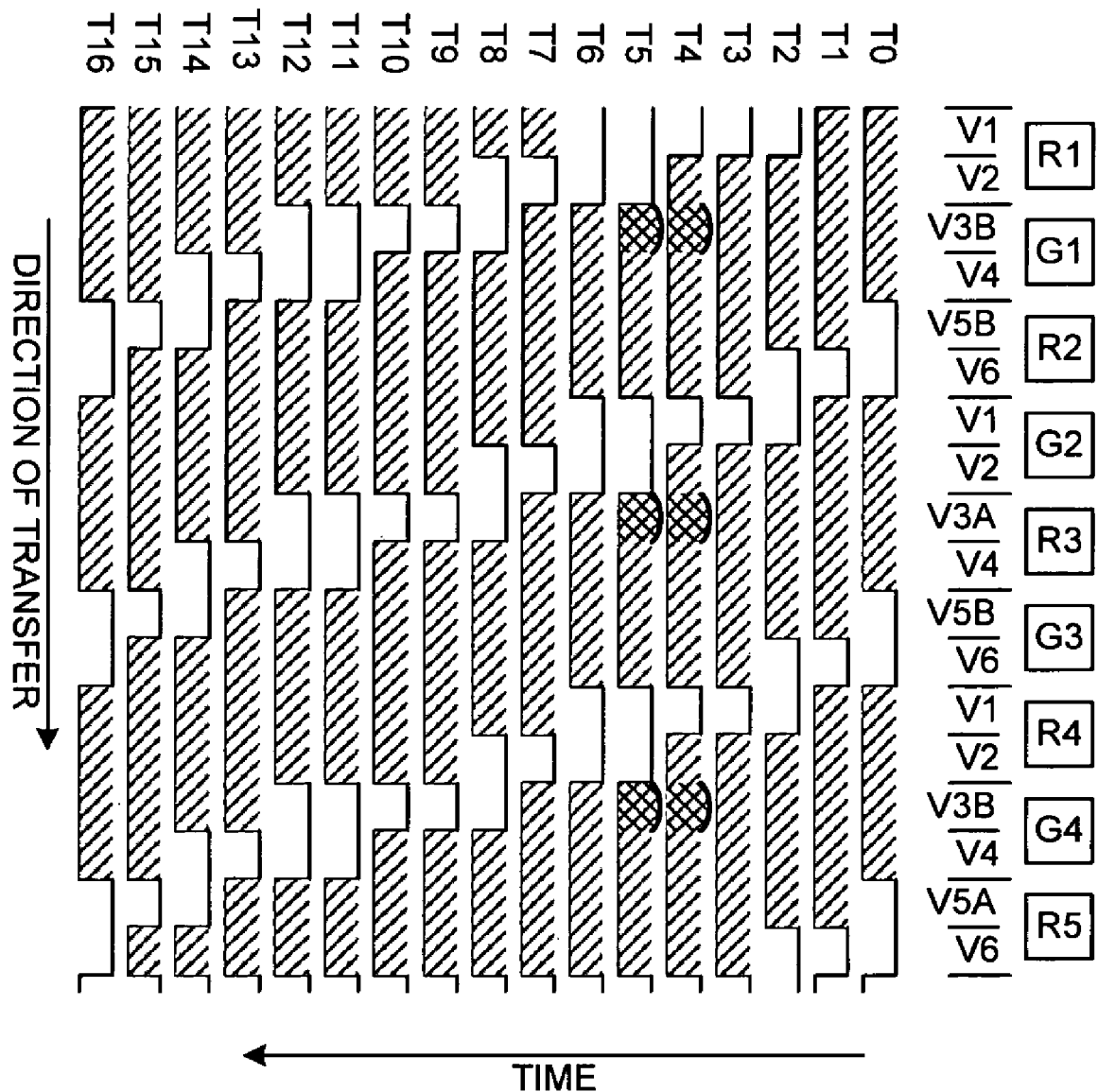
FIG. 11 is a potential diagram that illustrates the vertical transfer of data values (in the high-resolution readout capture mode) in the image sensor of FIG. 5.

FIG. 11 is a potential diagram for a full resolution vertical transfer readout. Three sensor elements G1, R3 and G4 are read out in the sequence of FIG. 11, are transferred to the horizontal transfer line, and are transferred out of the image sensor 103. This readout is a part of a readout of a first field of sensor elements. The sequence is repeated, but in the repeated sequence another set of three sensor elements (for example, sensor elements R2, G3 and R5) is read out. This readout is part of a readout of a second field of sensor elements. The process of FIG. 11 is repeated, field by field, until all the sensor elements of the vertical column have been read. In the present example, there are three readout fields. There is no pixel mixing.

Figure 12:
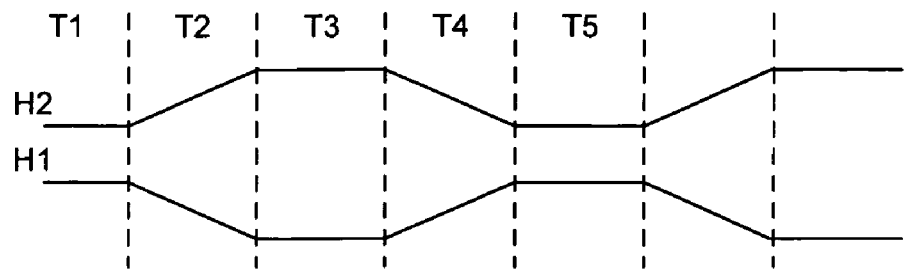
FIG. 12 is a waveform diagram that illustrates the horizontal pulse signals H1 and H2 that cause a horizontal transfer of data values through the horizontal transfer line of the image sensor of FIG. 5.

FIG. 12 illustrates the horizontal transfer signals H1 and H2 that are supplied to alternating horizontal transfer portions of horizontal transfer line 123 of FIG. 5. The vertical dimension in FIG. 12 is voltage. T1-T5 indicate time periods.

Figure 13:
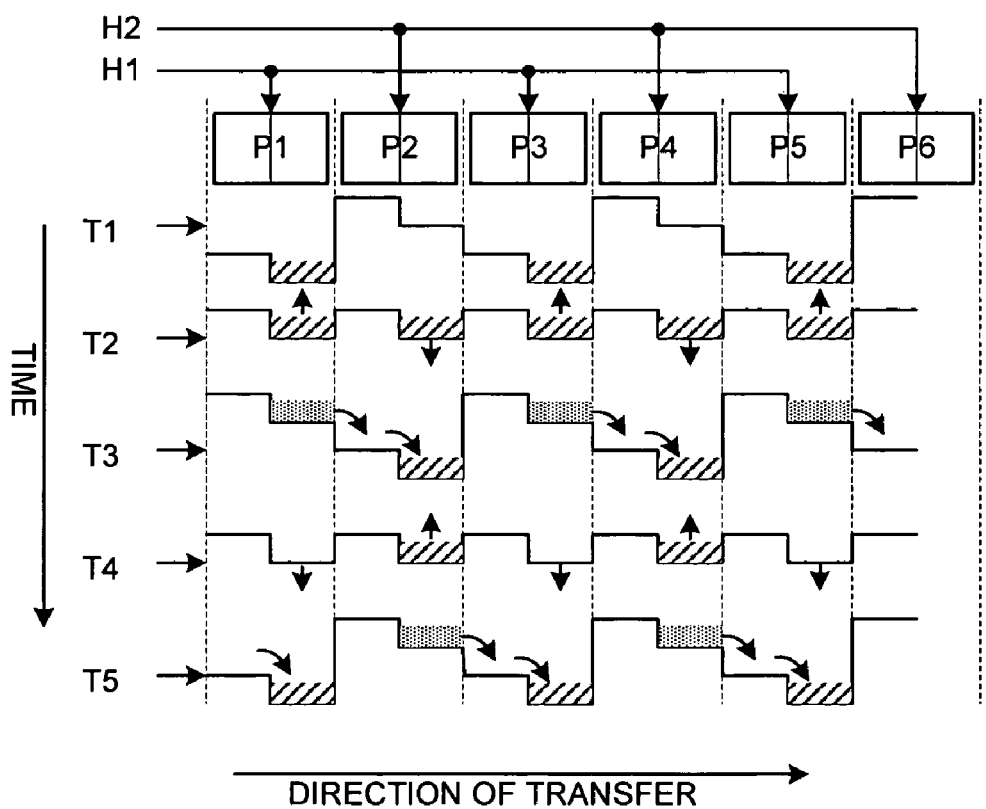
FIG. 13 is a potential diagram that corresponds to the waveform diagram of FIG. 12.

FIG. 13 is a potential diagram for the horizontal transfer line 123 when the horizontal transfer signals H1 and H2 of FIG. 12 are used. Unlike the vertical transfer sections, each of the horizontal transfer sections includes two parts. The right part is doped so that it has a deeper potential well than the left part for a given electrode potential. Note, for example, that the bottom of the depletion region under horizontal transfer portion P1 has a deeper step to the right. The cross-hatching in this deeper part indicates an accumulation of sensor element readout charge. As the horizontal transfer signals H1 and H2 are varied as indicated in FIG. 12, the sensor element readout charge is made to tumble down potential steps from left to right as time progresses. The charge is then lifted up in potential under control of the horizontal transfer signals, and the charge is again made to tumble down potential steps from left to right to output driver 126.

How the vertical transfer signals and horizontal transfer signals are supplied to image sensor 103 determines whether high resolution data is read out in the high resolution readout mode, or whether low resolution data is read out in the low resolution readout mode. If, for example, the vertical signals are not pulsed to the high voltage level 130 as illustrated in FIG. 7, but the vertical signals and horizontal signals are otherwise controlled as in an ordinary readout operation, then charge from sensor elements is not dumped into the vertical transfer lines but any residual charges in the vertical and/or horizontal transfer lines is swept out of the image sensor 103. This operation of removing residual charges is called a "clean out operation". This or a similar cleanout operation can be used to remove residual charges left over from a prior sequence of preview readout operations so that a subsequent full resolution capture of a digital image will be more free of adverse affects of such residual charges.

Although all of the sensor elements of FIG. 5 are described as being sensor elements used to detect light of one of three colors (red, green or blue), the description of FIG. 5 is a simplification. When no light is incident on a sensor element and data from the sensor element is read out of the image sensor and is digitized, the resulting digital data value generally will not be a digital zero. The digital data value will differ from the ideal digital zero black level by an amount that can vary. It is desired to be able to determine the amount the black level error, and to subtract that error amount from the data coming out of the image sensor to obtain black level corrected data. Image sensor 103 has a light impervious shield that extends around the periphery of the image sensor integrated circuit die. This shield covers a band of sensor elements around a central valid area of sensor elements. The shield prevents light from being detected by the covered sensor elements. The data value read out of the image sensor from sensor elements that are covered by the shield can therefore be considered to be the black level error.

Figure 14:
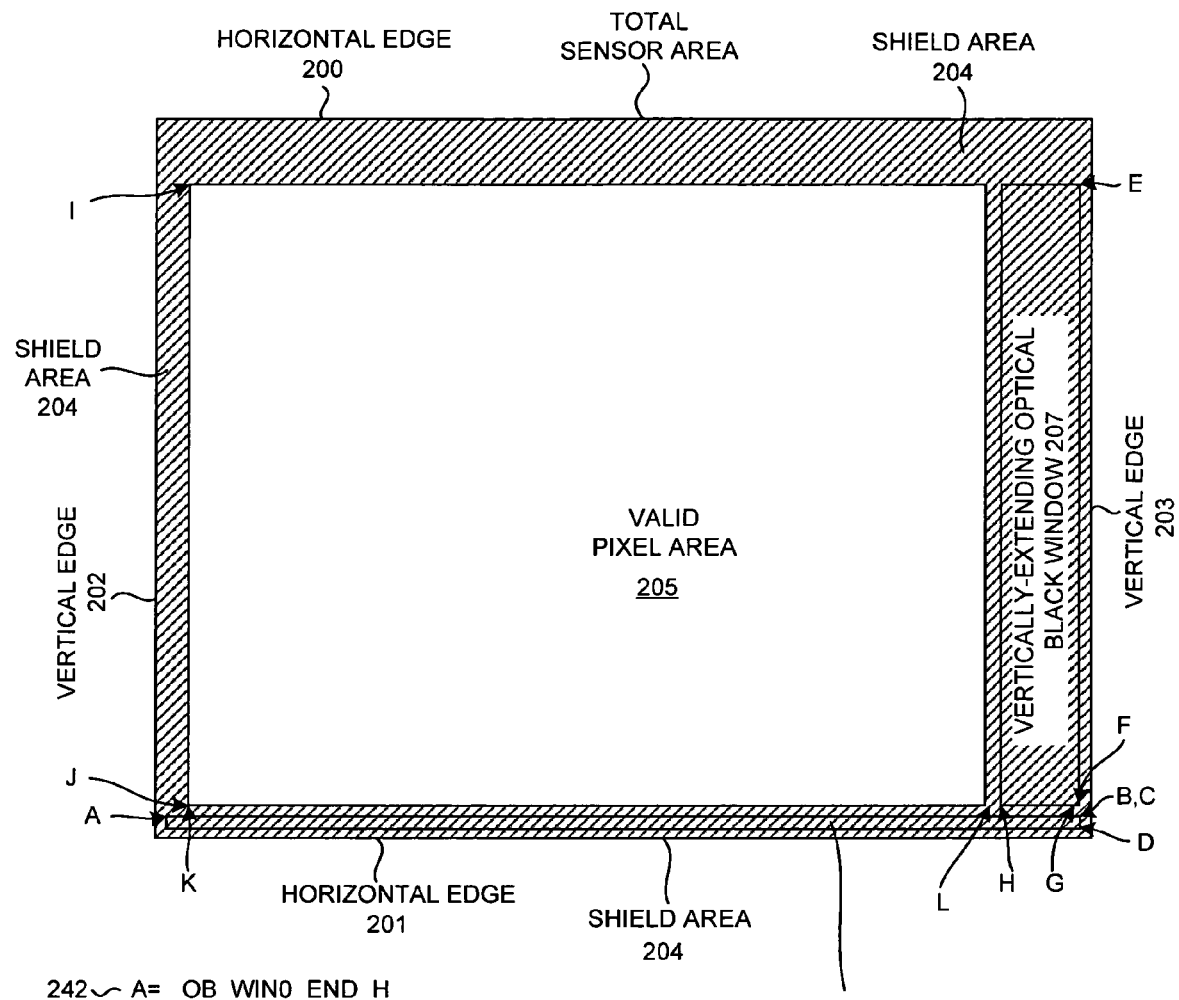
FIG. 14 is a top-down diagram of the image sensor integrated circuit of the camera of FIG. 4.

FIG. 14 is a top-down diagram of the top surface of image sensor 103. Image sensor 103 is an integrated circuit that has a pair of horizontal edges 200 and 201 and a pair of vertical edges 202 and 203. Edge 200 is the top edge of the integrated circuit. Edge 201 is the bottom edge of the integrated circuit. Edge 202 is the left edge of the integrated circuit. Edge 203 is the right edge of the integrated circuit. The dashed region indicates the shield area 204 of the image sensor that is covered by the light-blocking shield. The central undashed region indicates the valid pixel area 205 that is usable to capture an image. For manufacturing reasons, it may be difficult to provide repeatable and reliable valid area pixels up to the very edge of the integrated circuit. In some image sensors such as the image sensor 103 of FIG. 14, a distance of at least six sensor elements is shielded between a boundary of the valid area 205 and any integrated circuit edge. In the example of image sensor 103, there are six rows of shielded sensor elements between the bottom of valid area 205 and bottom edge 201. Similarly, there are six columns of shielded sensor elements between the left edge of valid area 205 and left edge 202. The image sensor manufacturer has provided a wider region of shielded sensor elements to the right of valid area 205 because data read from sensor elements in this area is to be used in determining an optical black level. Placement of valid area 205 may not be symmetrical with respect to the edges of the image sensor integrated circuit. Accordingly, in the example of FIG. 14, there are more than six rows of sensor elements between the upper boundary of valid area 205 and the top edge 200 of the integrated circuit.

Figure 15:
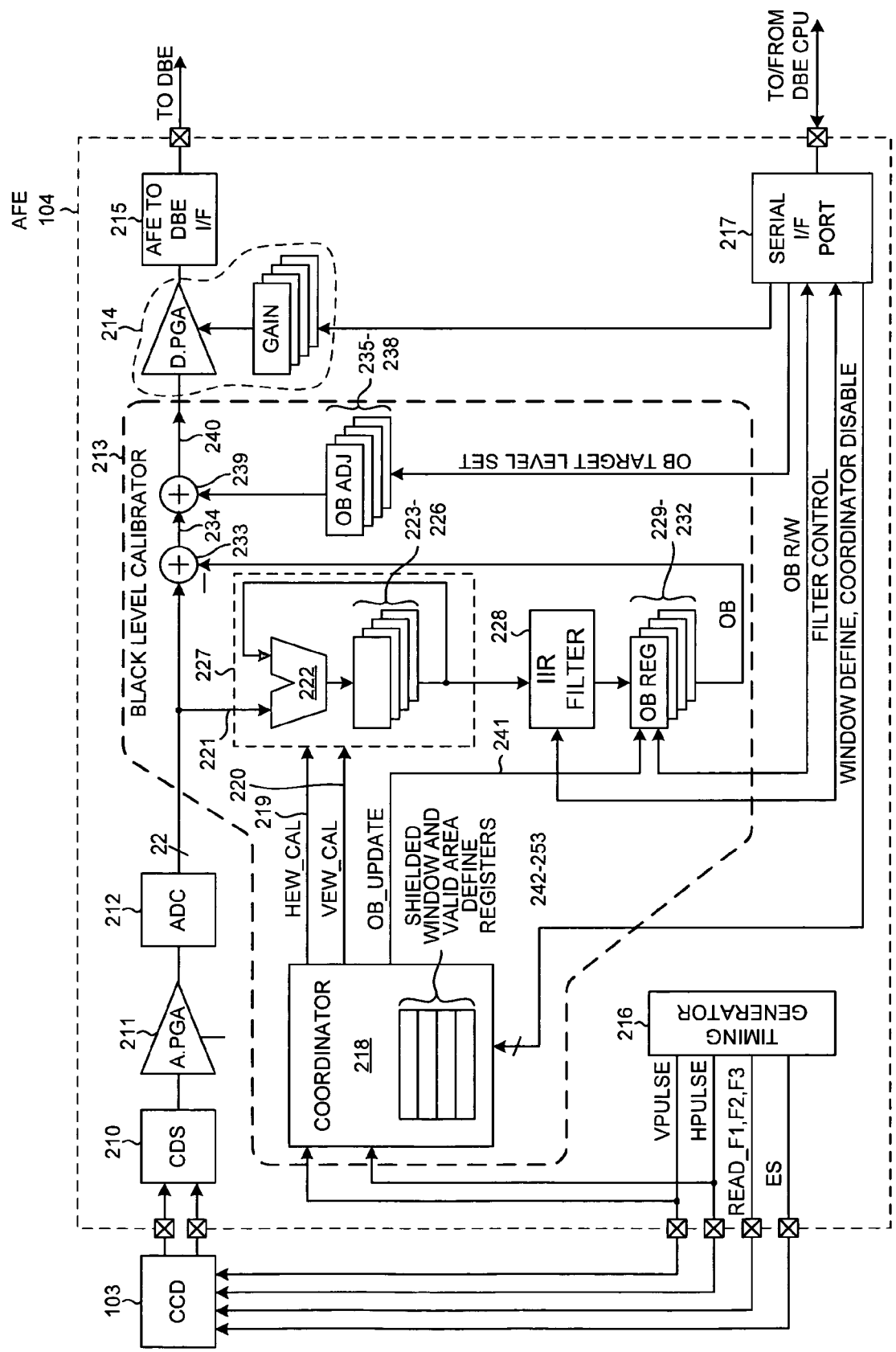
FIG. 15 is a simplified diagram of the AFE within the camera of FIG. 4.

FIG. 15 is a more detailed diagram of AFE 104 of FIG. 4. AFE 104 includes a correlated double sampling (CDS) mechanism 210, an analog programmable gain amplifier 211, a 22-bit analog-to-digital converter (ADC) 212, an entirely digital black level calibrator 213, a digital programmable gain amplifier 214, an AFE-to-DBE interface 215, a timing generator 216 and a serial interface port 217. CDS 210 receives differential analog pixel data information from image sensor 103. Each analog data value from the CCD is in the form of a pair of analog signal level signals. The first analog level signal indicates the unique reference voltage level of the particular data value, and the second analog level signal indicates the color brightness level. CDS 210 samples the analog signal magnitude between the two analog signal levels. The resulting analog signal magnitude is amplified by programmable analog amplifier 211. A different gain is typically used during the readout of "mixed" pixel values in the preview mode than is used during the readout of unmixed pixel values in the full capture mode. Another reason to use a different gain is to set a different ISO/sensitivity number. The output of analog amplifier 211 is digitized into a 22-bit data value by ADC 212. ADC 212 outputs a stream of 22-bit data values that correspond to the analog values output by CCD 103.

Black level calibrator 213 determines an optical black (OB) level value and subtracts this optical black (OB) level value from the incoming data value to obtain an optical black adjusted data (OBAD) value. The OBAD value is then optionally adjusted by a fixed offset amount, and the resulting amount is amplified by digital programmable gain amplifier 214. The resulting optical black adjusted value is then supplied via AFE-to-DBE interface 215 to image processing integrated circuit 105 for further processing.

Timing generator 216 supplies vertical transfer signals VPULSE and horizontal transfer signals HPULSE to CCD 103 such that CCD 103 will output data values from the desired sensor elements in the desired readout mode. Timing generator 216 can output the vertical and horizontal transfer signals such that CCD 103 outputs data in the low-resolution readout mode described above or such that CCD 103 outputs data in the high resolution readout mode described above.

A more detailed operation of AFE 104 is described in connection with the waveform diagram of FIG. 16. A coordinator portion 218 of black level calibrator 213 includes a set of registers 242-253 for storing information to define the valid pixel area 201 of image sensor, a horizontally-extending optical black window (see 206 of FIG. 14) of image sensor 103, and a vertically-extending optical black window (see 207 of FIG. 14) of image sensor 103. The values A, B, C and D in FIG. 14 define the horizontally-extending optical black window 206. Values A and B are numbers identifying particular columns of sensor elements. Values C and D are numbers identifying particular rows of sensor elements. The values I, J, K and L in FIG. 14 define the valid pixel area 205 of image sensor 103. The values I and J are numbers identifying particular rows of sensor elements. The values K and L are numbers identifying particular columns of sensor elements. The values E, F, G and H in FIG. 14 define the vertically-extending optical black window 207. The values E and F are numbers identifying particular rows of sensor elements. The values G and H are numbers identifying particular columns of sensor elements. The window defining values A through L are loaded by DBE 105 via serial interface port 217. In the present example, the horizontally-extending optical black window 206 extends all the way from the leftmost column of sensor elements to the rightmost column of sensor elements. The window 206 extends below the valid pixel area 205 between the valid pixel area 205 and the lower horizontal edge 201 of the image sensor integrated circuit.

Initially, the user of camera 100 is preparing to take a digital photograph. A sequence of low-resolution images is therefore read from the image sensor 103 in the low-resolution readout mode described above as the user pans around and composes a photograph to be captured. Timing generator 216 therefore outputs the vertical and horizontal transfer signals to CCD 103 as set forth above to cause CCD 103 to output the low-resolution data during this preview operation. As illustrated in the waveforms of FIG. 16, coordinator 218 does not assert the HEW_CAL (horizontally-extending window calibrate) signal 219 during the preview mode readouts. Coordinator 218 does, however, assert the VEW_CAL (vertically-extending window calibrate) signal 220 when data values for sensor elements in the vertically-extending window 207 are being supplied out of ADC 212 and onto the input port 221 of accumulator 227. Coordinator 218 includes counters that count the vertical transfer pulses and horizontal transfer pulses output by timing generator 216 to determine when the data present on input port 221 is from a sensor element within the defined vertically-extending window 207. Whenever the VEW_CAL signal 222 is asserted, then accumulator 227 adds the value on port 221 to the accumulated value in an appropriate one of several registers 223-226 in the accumulator. An adder 222 generates the sum of the value on port 221 and the previously accumulated value. The resulting sum is then stored in the appropriate one the four registers 223-226. There is one register for each color sensed by image sensor.

In the present example, image sensor only senses three colors, so only three of the registers are used. The accumulated values in registers 223-226 change as the values for the vertically-extending window are read at the beginning of the readout of each row of sensor elements. When readout of the entire low-resolution frame is complete, then the accumulated value (the accumulated value may be an average of the values that are accumulated) is supplied to a programmable digital filter 228. In the present example, programmable digital filter 228 is a single-tap IIR (infinite impulse response) filter that is enabled in the low-resolution preview readout mode and in video mode. In the ordinary high-resolution still capture mode, the programmable digital filter is disabled and is a simple pass through. In the movie mode, burst capture mode, and preview mode, however, it is desired to reduce the rate of change of the OB value (reduce the value update sensitivity) from frame to frame so that there is no readily perceptible flickering of the sequence of image frames due to changing OB levels. Programmable digital filter 228 smoothes the change in OB value from frame to frame by applying the following equation:

$$\text{Next}DFO = \text{Old}DFO + (\text{New}DFO - \text{Old}DFO) >> \text{BFILT\_WIN0/1} \quad \text{(eq. 1)}$$

The value "NextDFO" is the next value to be output from the digital filter. The value "OldDFO" is the last value to have been output from the digital filter (the value output for the previous preview frame). The value BFILT_WIN0/1 is a four-bit programmable value that regulates the rate of change of the output of the digital filter from one half of the amount (NewDFO−OldDFO) to $\frac{1}{32{,}768}$ of the amount (NewDFO−OldDFO). The symbol ">>" indicates shifting a number of times indicated by the value to the right of the symbol. For example, shifting no times does not change the value of (NewDFO−OldDFO). Shifting one time effectively divides the value (NewDFO−OldDFO) by two. Shifting three times effective divides the value (NewDFO−OldDFO) by eight. In the present example of filtering in the preview example of FIG. 16, BFILT_WIN0/1 is set to one. Programmable digital filter 228 applies equation one above to each of the color channels as the succession of frames of low-resolution image data is read out of image sensor 103 in the preview mode. The resulting output of programmable digital filter 228 for a particular color is stored in a corresponding one of four OB shadow registers 229-232 at the end of the readout of each frame. The OB value in the shadow register for the particular color is subtracted by subtracting circuit 233 from the data value so as to generate an optical black adjusted data (OBAD) value on signal lines 234. A programmable "OB adjust value" for the color is stored in a corresponding one of four registers 235-238. This OB adjust value is added by adder 239 to the OBAD value on signal line 234 to generate the value that is output from the black level calibrator 213 onto lines 240. Accordingly, it is seen that there are four color channels through the black level calibrator 213. The OB shadow registers 229-232 are updated by the rising edge of the signal OB_UPDATE on line 241.

Figure 16:
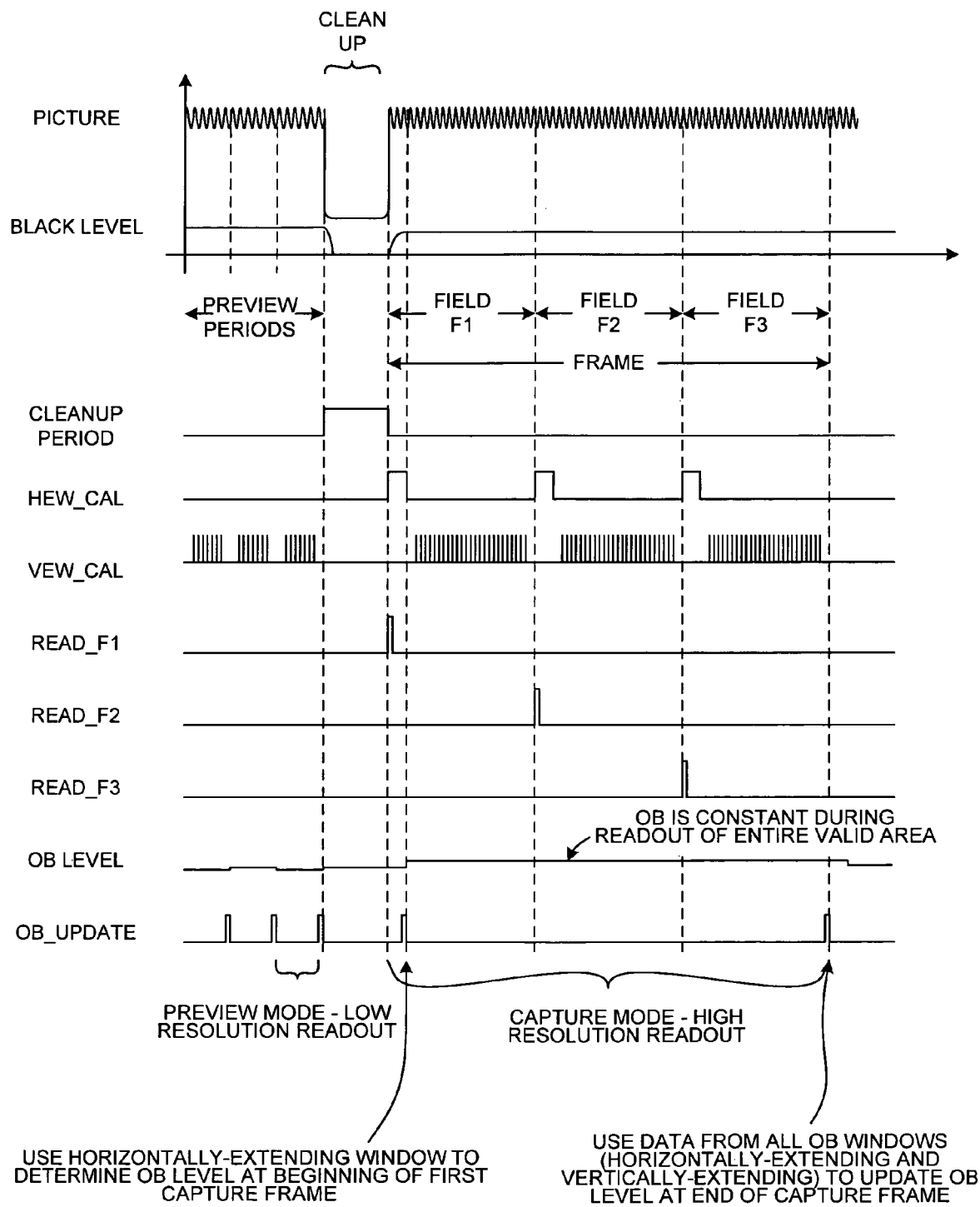
FIG. 16 is a simplified waveform diagram showing an operation of the camera of FIG. 4. In the operation of FIG. 4, there is no vertical drift compensation, rather the optical black (OB) values used to adjust data values read from the valid area of the sensor are fixed throughout the readout and processing of the three fields of valid area values.

As illustrated in the waveform diagram of FIG. 16, the VEW_CAL signal is asserted at the beginning of the readout of every row of sensor elements when the data being processed is sensor data from sensor elements in the defined vertically-extending window 207 at the right of the valid area 205. This is indicated in FIG. 16 by the sets of vertical lines in the VEW_CAL waveform. Each vertical line represents the time when data output by sensor elements in vertically-extending window 207 at right end of a row of sensor elements are being supplied to black level calibrator 213. In the example of image sensor 103 of FIG. 14, a row of data values is transferred down into the horizontal transfer line, and the data values in the horizontal transfer line are then transferred out to the right. Accordingly, rows of data values are read out, row by row (low resolution rows), starting at the bottom of the image sensor and proceeding upward to the top of the image sensor. Within the readout of each row of data values, the data output from the sensor element on the right of the image sensor is read out first, and then data values are read out proceeding from right to left across the image sensor. (The readout "data" as the term is used here can refer to either analog data values within the image sensor and/or the corresponding digital values within the AFE on the input port of the black level calibrator 213.)

In the example of FIG. 16, the OB values (OB) determined by black level calibrator 213 remains constant through the readout of the valid pixel area during the readout of each frame in the preview mode. (There is one such OB value for each color channel.) In the example of FIG. 16, there are three such preview mode low-resolution readout operations.

Next, camera 100 responds to the user's pressing shutter button 111, by performing a "cleanup operation". Vertical and horizontal transfer pulses are output by timing generator 216 without the high voltage pulses (130 of FIG. 7) that would cause sensor elements to output charges onto vertical transfer lines. The vertical and horizontal transfer pulses operate to sweep out residual charges in the vertical and/or horizontal transfer lines are described above. The waveform labeled "cleanup period" in FIG. 16 is not an actual electrical signal, but rather is provided to denote the duration of the cleanup operation.

Once the cleanup operation is complete, timing generator 216 outputs the vertical and horizontal transfer pulses to carry out a full-resolution readout operation in the capture mode. Data is read out in a first field, a second field, and then a third field. Initially, the values in registers 223-226 cleared. The data values for the lowest row of sensor elements in the first field is read out of image sensor 103 first, starting with the data value from the rightmost and bottommost sensor element at the lower right of the two-dimensional matrix of sensor elements. Coordinator 218 uses information stored in the window define registers 242-253 to determine that the data values being read out are from sensor elements of the defined horizontally-extending window 206. Coordinator 218 therefore asserts the HEW_CAL signal. HEW-CAL being asserted causes accumulator 227 to start accumulating data values. As described above, there are three parallel color channels. Programmable color pattern information is loaded into the coordinator 218 via serial port 217 beforehand, where this color pattern information indicates what color channel is to be associated with each sensor element at a particular location in the pattern. Using this color pattern information, coordinator 218 determines the color channel corresponding to each data value on input port 221. In the present example where there are only three colors, red, green and blue, there are only three color channels and only three of the registers 223-226 are used and only three of the shadow registers 229-232 are used.

As data from the bottom six rows of sensor elements of image sensor 103 is read out of the image sensor and into AFE 104, the data values for each of the three color channels are accumulated in a corresponding one of registers 223-225. Because the readout mode is the full capture readout mode, digital filter 228 is disabled and is a pass through. At the end of the readout of the first field sensor elements in the horizontally-extending window 206, coordinator 218 asserts the OB_UPDATE signal on line 241. This is illustrated in the OB_UPDATE waveform at the bottom of FIG. 16. Assertion of OB_UPDATE causes an OB level value to be stored in each of the three used shadow registers 229-231. These OB level values are then used to adjust values output from ADC 212 during readout of valid area 205 in order to obtain optical black adjusted data (OBAD) that is output from black level calibrator 213 on lines 240. These OB values, which were determined at the beginning of the first field readout, are not changed throughout the period of the readout of the first three fields in the full capture mode. In the present example where there are six rows in horizontally-extending window 206, only two rows of values from this window 206 are read out in the first field readout. The OB value used to adjust valid area data values during the readout of the first three fields of the first full capture mode readout is therefore determined based on just two rows of the six rows of window 206.

As the readout of first field data values from next rows of sensor elements takes place, signal VEW_CAL is asserted at the beginning of each row because the data values being read out correspond to sensor element in the vertically-extending window 207. These values are accumulated in accumulator 227 as set forth above. Digital filter 228 does not output another output value and shadow registers 229-232 are not updated because the end of the frame has not been reached.

Figure 17:
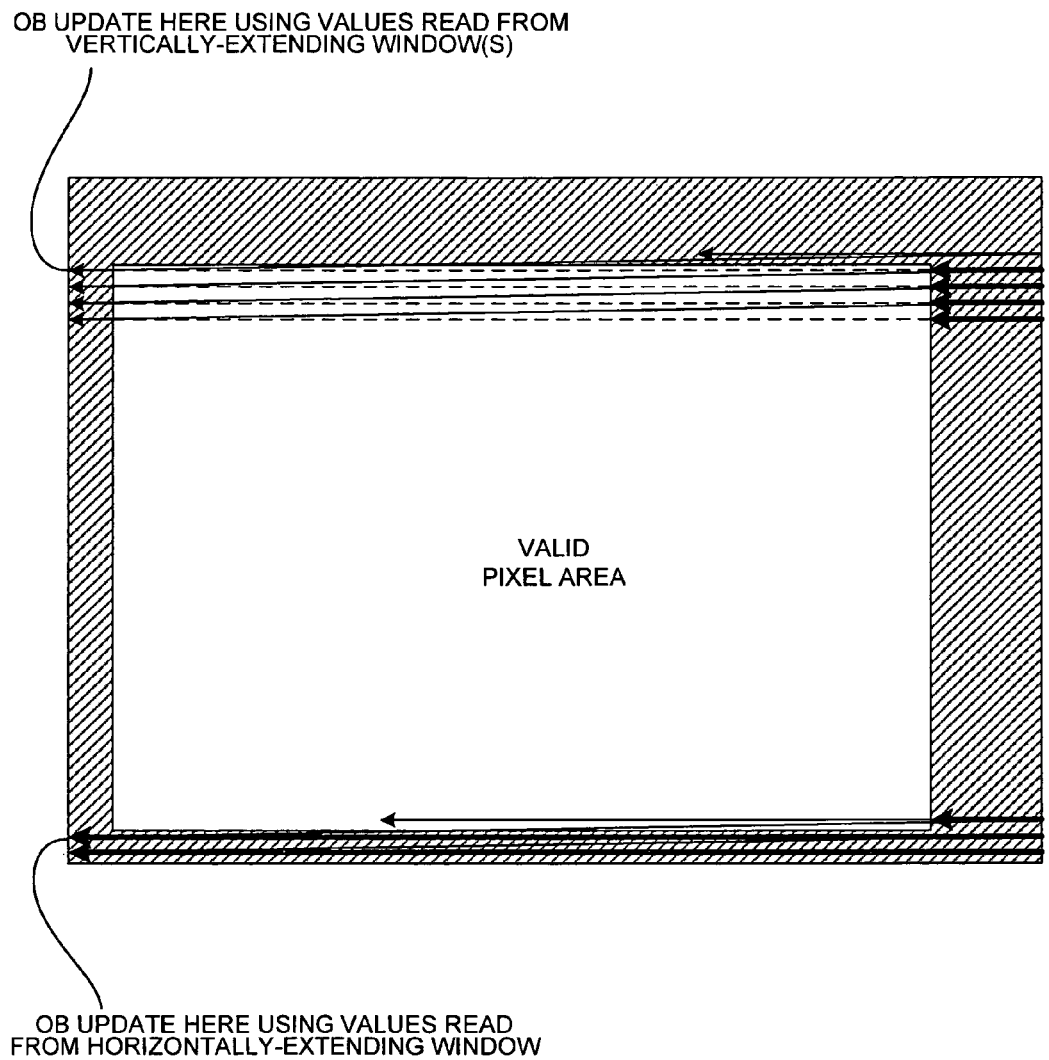
FIG. 17 is a diagram that illustrates where the OB values are updated in the operational example of FIG. 16.

FIG. 17 illustrates the readout of the first field. Two rows of values in horizontally-extending window 206 correspond to the first field. At the end of the readout of these values, the OB levels output from shadow registers 229-232 are set and these OB levels are used to adjust values read out from the valid area above. FIG. 17 illustrates how data values in the vertically extending window 207 at the beginning of each row are accumulated for generating of the next OB levels, but the current OB levels output from shadow registers 229-232 are not changed during readout of the valid area.

Next, at the beginning of the second field readout, the HEW_CAL is asserted again such that the data values in the shielded window 206 for the second field are also accumulated in accumulator 227. Also, as in the readout of the first field, the VEW_CAL is asserted at the beginning of the readout of each row so that the data values in the vertically-extending shielded window 207 for the second field are also accumulated. The OB values output by shadow registers 229-232 do not, however, change. The same OB values are used to adjust the valid area readout values in the second field as were used to adjust the valid area readout values in the first field. The readout of the third field proceeds in the same manner as the readout of the second field. At the conclusion of the readout of the third field, coordinator 218 asserts the OB_UPDATE signal such that the OB level values in shadow registers 229-232 are changed. Data values used in the determination of the new OB level values include data values from the horizontally-extending shielded window 206 and the vertically-extending shielded window 207 in each of the three fields of the preceding frame. Digital filter 228 in the full capture readout is a pass through.

Figure 18:
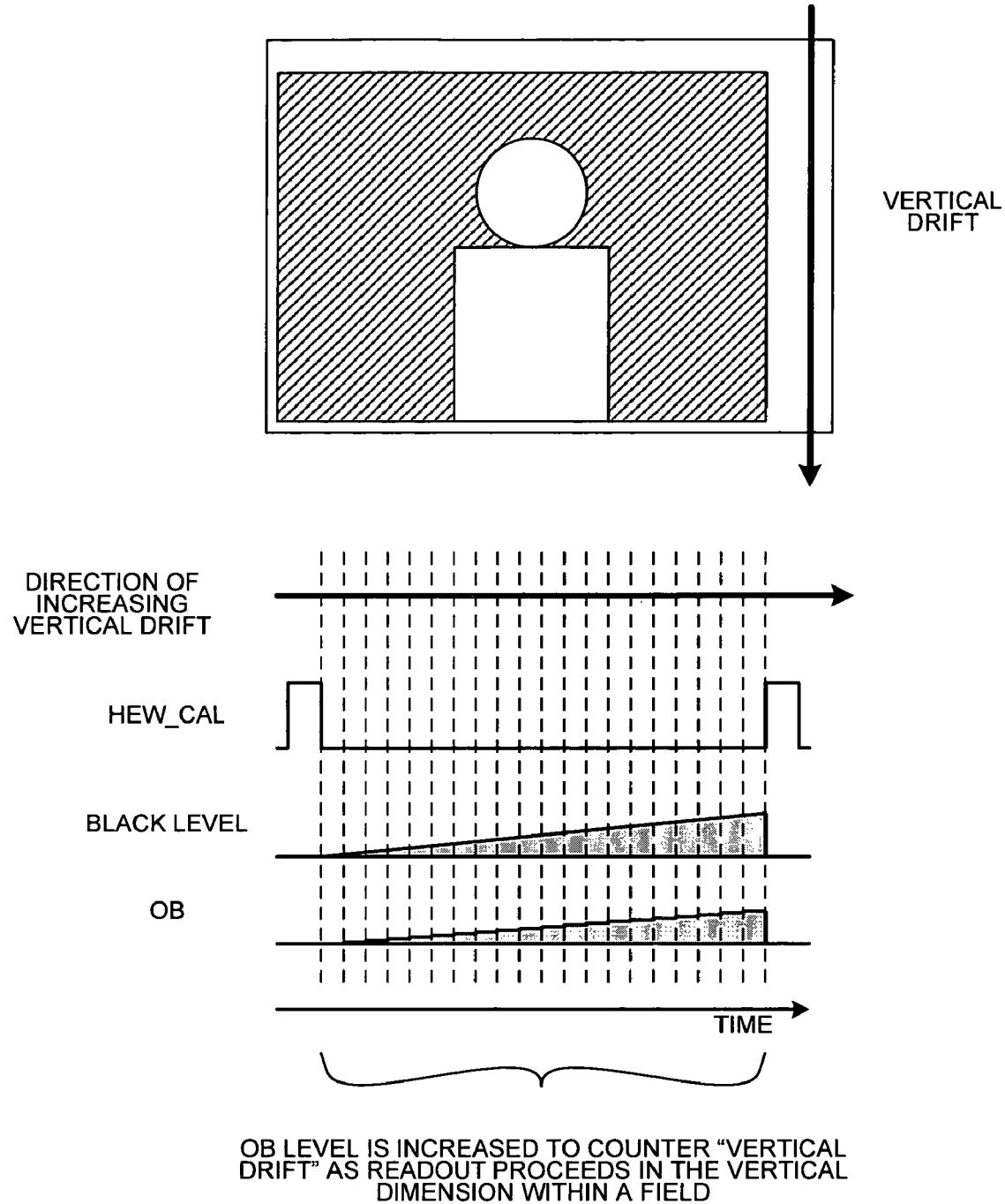
FIG. 18 is a diagram that illustrates an embodiment of the camera of FIG. 4 in which the OB level is increased during the readout of valid area values in order to counter the effects of vertical drift caused by leak current.
Figure 19:
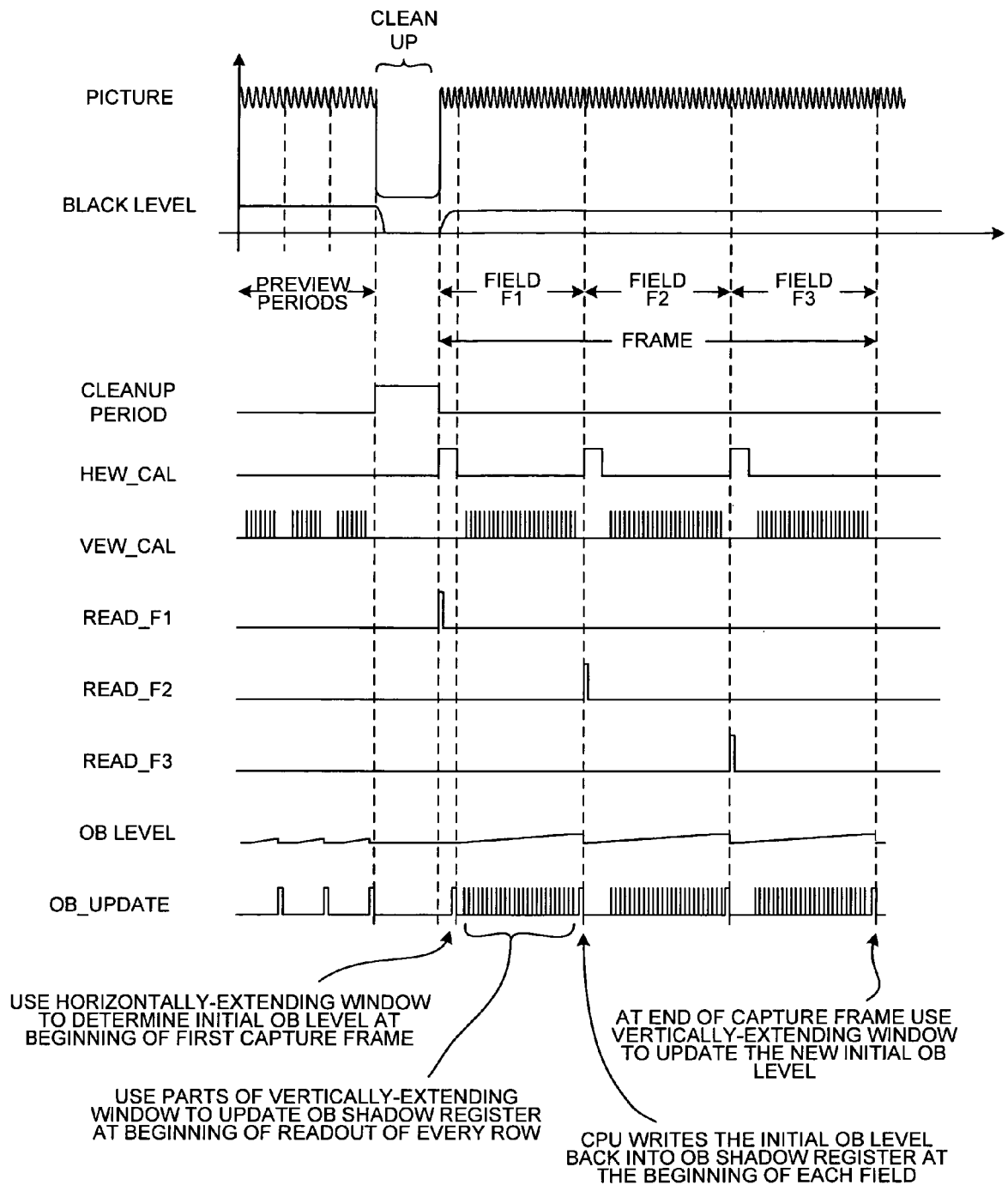
FIG. 19 is a waveform diagram that corresponds to FIG. 18. The OB values are increased during the readout of a field of valid area values in order to counter the effects of vertical drift. After the readout of the valid area values of the field is complete, the original OB values are used again as the initial OB values used in the readout of the valid area values of the next field.

Black level calibrator 213 is also configurable to operate in another mode. FIGS. 18 and 19 illustrate operation in this mode. Rather than fixing the OB level values output from shadow registers 229-232 and maintaining these values throughout the readout of the valid area of each of the three fields, each of the OB level values output from shadow registers 229-232 is increased as the readout of a field proceeds row by row in an upward direction. At the beginning of the second field, the original OB level values output by shadow registers 229-232 are reset. The OB level values output from the shadow registers 229-232 are increased again as the readout of the second field proceeds row by row in an upward direction. At the beginning of the third field, the OB level values are reset again. Vertically-extending window 207 is segmented as determined by values loaded through serial interface 217 into coordinator 218. The data values read out from each of these segments are accumulated and are used to increase the current OB level such that as the readout proceeds upward in a field, the OB level is seen to increase as illustrated in FIG. 18. This increase in OB level is usable to counter effects of "vertical drift" that is seen in some CCD image sensors. FIG. 19 is a waveform that corresponds to the operation set forth above for countering the effects of vertical drift. Note that the waveform labeled OB_LEVEL is seen to increase through the period of a field readout, and is then seen to return to the original OB level used as the original OB level in that frame. The original OB level is changed from frame to frame as set above in connection with the waveforms of FIG. 16.

AFE 104 is versatile and sees use in both expensive high end cameras as well as relatively inexpensive more simple cameras. In a simple camera, the complex black level calibration involving accumulator 227 and digital filter 228 need not be used. Rather, DBE 105 disables coordinator 218, disables the pulsing of the OB_UPDATE signal, and writes OB level values into OB shadow registers 229-232 via serial port 217. The OB level values used are then directly set and controlled by DBE 105. When the OB level values and OB target values and gain values are changed, and the values to which they are changed, are under full control of DBE 105 through serial port 217.

In another embodiment, multiple preview mode readout operations are performed as in FIG. 16. The user then presses shutter button 111. AFE 104 within camera 100 responds to the shutter button press by performing a cleanup operation as illustrated in FIG. 16 followed by a high-resolution three-field readout operation. But rather than only using values from the horizontally-extending window 206 to determine the OB level value used to adjust valid area values of the first frame, values from both horizontally-extending window 206 and vertically-extending window 207 are used to determine a set of OB level values which are then used to adjust valid area values readout during a second frame readout operation. The valid area data values that are read out during the first frame readout operation are not retained as an image to be stored and presented to the user as the captured image, but rather the valid area data values that are read out during the second frame readout operation are the values that are retained as the image that is presented to the user as the captured image. The OB level values used in the adjustment of valid area data values to obtain optical black adjusted data (OBAD) of the second frame are not changed during the second frame readout operation. This embodiment is similar to the embodiment described above in connection with FIG. 16 in that data from an entire row of shielded sensor elements is used to obtain the OB levels used to adjust valid area data values for the captured frame, and these OB levels are not changed during the entire readout of the valid area data values. This embodiment is also similar to the embodiment described above in connection with FIG. 16 in that the averaging of data values in accumulator 227 for determination of the OB level values is not affected by data read out in the prior preview mode readout operations.

In one advantageous aspect, using a horizontally-extending window to determine an OB level value and then using that OB level value to OB adjust valid area values of the first frame allows the power up time of an image sensor prior to the full-resolution capture of valid area image data to be minimized. Image sensor 103 captures images with less noise at lower temperatures. Minimizing the time that image sensor 103 is powered before the image is captured helps prevent increasing the temperature of the image sensor due to electrical power dissipation at the time of image capture. In one type of conventional camera, the image sensor is maintained in a powered down state until the shutter button is pressed. The image sensor is then powered up, and a first frame of image data is read out in order to obtain OB values from shielded areas of the image sensor. After the OB level has been determined from the readout of this first frame, a second full-resolution frame is captured and read out of the sensor. The OB level value determined from the first frame is used to adjust the valid area sensor output values of the second frame. The sensor is therefore powered up and dissipating electrical power for at least one frame readout prior to the capture of the valid area sensor data for the actual digital photograph. In one embodiment of the novel camera of FIG. 4, AFE 104 of FIG. 15 keeps image sensor 103 unpowered until shutter button 111 is pressed. (Preview mode functionality in this embodiment is provided without using the main image sensor 103 used to capture the image of the ultimate digital photograph.) When shutter button 111 is pressed, the main image sensor 103 is powered up. In the first frame readout after sensor power up, the OB level is determined and is used to OB level adjust the valid area sensor output data for the first frame. The sensor output data used to create the ultimate digital photograph is therefore from the first frame after image sensor power up, whereas in the conventional camera described above the sensor output data used to create the ultimate digital photograph is from the second frame after image sensor power up.

Although the present invention has been described in connection with certain specific embodiments for instructional purposes, the present invention is not limited thereto. The novel method and apparatus and techniques described above do not have to used in combination with an image sensor of type described above, rather the novel method and apparatus and techniques are usable with any type of image sensor that requires black level calibration. In one embodiment, DBE 105 can control and change the algorithm accumulator 227 applies to incoming data values to generate the values output to digital filter 228. Accumulator 227 can, for example, be programmed through serial port 217 to average the incoming data values on input port 221 for a given color channel. In some embodiments, the accumulator 227 and digital filter 228 logic is replaced with a general purpose digital filter circuit that is programmable. The digital filter equation applied to the incoming stream of data values on input port 221 can be programmed by DBE 105 through serial port 217. The frequency response of the filter applied to each of the different color channels can be independently set as can the digital filter algorithm applied. The digital filter algorithm applied can be different depending on the operating mode of the camera. If the camera is being used in high-resolution full capture burst mode operation, then a faster but less precise OB level calibration algorithm can be applied, whereas if the same camera is being used in high-resolution full capture mode but is not in burst mode operation then a slower but more precise OB level calibration algorithm can be applied. Different algorithms can be used by the same AFE integrated circuit design depending on the type of image sensor employed. Where a Bayer pattern CCD image sensor is used, there may be four color channels through the entire black level calibrator 213: one for red, one for blue, one for green next to red, and one for green next to blue. Accordingly, various modifications, adaptations, and combinations of various features of the described embodiments can be practiced without departing from the scope of the invention as set forth in the claims.

What is claimed is:

1. A method comprising:
   (a) reading first data from an image sensor in a preview mode, wherein the image sensor includes a plurality of rows of sensor elements, wherein the image sensor has a horizontally extending edge, a vertically extending edge, a valid area of sensor elements and a horizontally-extending shielded area of sensor elements, wherein the horizontally-extending shielded area extends horizontally between the valid area and the horizontally extending edge;
   (b) reading second data from the horizontally-extending shielded area in a capture mode;
   (c) using the second data read in (b) to determine an optical black value (OB value);
   (d) reading third data from the valid area in the capture mode, wherein the OB value is determined in (c) before a substantial amount of third data is read from the valid area in (d), and wherein the third data in (d) is read from a first frame having a plurality of fields; and
   (e) using the OB value determined in (c) to modify the third data read in (d) to obtain optical black adjusted data (OBAD), wherein the OB value is not changed until after third data has been read in (d) for each of the plurality of fields of the first frame from substantially all the sensor elements of the valid area.

2. The method of claim 1, wherein the image sensor is an integrated circuit that has a surface area, and wherein the valid area occupies a majority of the surface area, and wherein the horizontally-extending shielded area is taken from the group consisting of: a top shielded area that extends between a top edge of the integrated circuit and an upper portion of the valid area, and a bottom shielded area that extends between a bottom edge of the integrated circuit and a bottom portion of the valid area.

3. The method of claim 2, further comprising:
   performing an image sensor cleanout operation after (a) and before (b).

4. The method of claim 2, wherein a first OB value is determined in (c) for a first color, wherein a second OB value is determined in (c) for a second color, wherein the first OB value is used in (e) to obtain optical black adjusted data (OBAD) for the first color, and wherein the second OB value is used in (e) to obtain optical block adjusted data (OBAD) for the second color.

5. The method of claim 1, wherein steps (a) through (e) are performed by an integrated circuit, the method further comprising:
   loading information into the integrated circuit, wherein the integrated circuit uses the information to determine whether data read from the image sensor was read from the horizontally-extending shielded area.

6. A method comprising:
   (a) reading first data from an image sensor in a preview mode, wherein the image sensor is an integrated circuit that includes a plurality of rows of sensor elements, wherein the image sensor has a horizontally extending edge, a vertically extending edge, a valid area of sensor elements and a horizontally-extending shielded area of sensor elements, wherein the horizontally-extending shielded area extends horizontally between the valid area and the horizontally extending edge;
   (b) reading second data from the horizontally-extending shielded area in a capture mode;
   (c) using the second data read in (b) to determine an optical black value (OB value);
   (d) reading third data from the valid area in the capture mode, wherein the OB value is determined in (c) before a substantial amount of third data is read from the valid area in (d), and wherein the third data in (d) is read from a first frame having a plurality of fields; and
   (e) using the OB value determined in (c) to modify the third data read in (d) to obtain optical black adjusted data (OBAD), wherein the OB value is not changed until after third data has been read in (d) for each of the plurality of fields of the first frame from substantially all the sensor elements of the valid area, wherein the modifying of (e) involves:
      supplying the third data read from the valid area in (d) to a digital accumulator such that the digital accumulator outputs a digital value;
      using a digital filter to filter a stream of digital values output from the digital accumulator, the digital filter outputting a filter output value;
      storing the filter output value; and
      subtracting the filter output value from third data read from the valid area in (d).

7. The method of claim 6, wherein the filter output value is stored in a register, wherein integrated circuit includes a port that is usable to write a value into the register.

8. A method comprising:
   (a) reading first data from an image sensor in a preview mode, wherein the image sensor is an integrated circuit that includes a plurality of rows of sensor elements, wherein the image sensor has a horizontally extending edge, a vertically extending edge, a valid area of sensor elements, a horizontally-extending shielded area of sensor elements, and a vertically extending shielded area of sensor elements, wherein the horizontally-extending shielded area extends horizontally between the valid area and the horizontally extending edge;

(b) reading second data from the horizontally-extending shielded area in a capture mode;

(c) using the second data read in (b) to determine an optical black value (OB value);

(d) reading third data from the valid area in the capture mode, wherein the OB value is determined in (c) before a substantial amount of third data is read from the valid area in (d), and wherein the third data in (d) is read from a first frame having a plurality of fields;

(e) using the OB value determined in (c) to modify the third data read in (d) to obtain optical black adjusted data (OBAD), wherein the OB value is not changed until after third data has been read in (d) for each of the plurality of fields of the first frame from substantially all the sensor elements of the valid area;

(f) reading data from the vertically-extending shielded area during a readout of the first frame of image data, and using the data read from the vertically-extending shielded area to determine a second optical black value (OB value);

(g) reading a second frame of image data from the valid area of the image sensor in the capture mode; and (h) using the second OB value determined in (f) to modify the second frame of image data read in (g) to obtain second optical black adjusted data (OBAD).

9. A method comprising:

(a) reading first data from an image sensor in a preview mode, wherein the image sensor is an integrated circuit that includes a plurality of rows of sensor elements, wherein the image sensor has a horizontally extending edge, a vertically extending edge, a valid area of sensor elements and a horizontally-extending shielded area of sensor elements, wherein the horizontally-extending shielded area extends horizontally between the valid area and the horizontally extending edge;

(b) reading second data from the horizontally-extending shielded area in a capture mode after performing an image sensor cleanout operation;

(c) using the second data read in (b) to determine an optical black value (OB value);

(d) reading third data from the valid area in the capture mode, wherein the OB value is determined in (c) before a substantial amount of third data is read from the valid area in (d), and wherein the third data in (d) is read from a first frame having a plurality of fields; and (e) using the OB value determined in (c) to modify the third data read in (d) to obtain optical black adjusted data (OBAD), wherein the OB value is not changed until after third data has been read in (d) for each of the plurality of fields of the first frame from substantially all the sensor elements of the valid area, wherein a low resolution frame of data is read out of the image sensor in (a), the low resolution frame being the last in a sequence of low resolution frames, and wherein the second and third data read in (b) and (d) is from a high resolution frame, and wherein the high resolution frame is the first high resolution frame of data to be read out of the image sensor after the low resolution frame that is read out in (a).

10. An integrated circuit, comprising:

means for determining an optical black value (OB value) using first data read from a horizontally-extending shielded area of an image sensor, wherein the image sensor includes a plurality of horizontally-extending rows of sensor elements, wherein the horizontally-extending shielded area extends between a horizontal edge of the image sensor and a valid area of the image sensor, wherein the first data is data from a first frame of image data, wherein the first frame is a high-resolution frame having a plurality of fields, wherein no data from a frame of image data other than the first frame is used in the determining of the OB value, and wherein the OB value is determined before a substantial amount of first frame data from the valid area of the image sensor is read from the image sensor; and a register that stores the same OB value throughout substantially the entire time that first frame data for each of the plurality of fields is read out from the valid area of the image sensor.

11. The integrated circuit of claim 10, wherein the means includes:

a digital accumulator having a digital input port and a digital output port;

a digital filter having a digital input port that is coupled to the digital output port of the accumulator, the digital filter outputting the OB value to the register; and a coordinator circuit that supplies a signal to the accumulator, the signal being indicative of a time when data from the horizontally-extending shielded area of the image sensor is present on the digital input port of the accumulator.

12. The integrated circuit of claim 10, wherein the means includes:

a plurality of registers that store information that is usable by the means to determine whether data in the integrated circuit is data read from the horizontally-extending shielded area of the image sensor.

13. The integrated circuit of claim 12, further comprising:

a serial port, wherein a processor external to the integrated circuit can load the information into the plurality of registers via the serial port.

14. The integrated circuit of claim 10, wherein the first frame is the first frame of data read out from the image sensor in a capture mode after an image sensor cleanout operation is performed.

15. The integrated circuit of claim 14, wherein the means is also for:

using data read from a vertically-extending shielded area of the image sensor during a readout of the first frame to generate a second OB value, wherein the second OB value is loaded into the register after the readout of the valid area for the first frame has been completed.

16. An analog front end (AFE) integrated circuit, comprising:

a first set of registers, the contents of which are usable by circuitry within the AFE to identify data read from a horizontally-extending shielded area of an image sensor, wherein the circuitry uses data read from the horizontally-extending shielded area during a first full resolution readout to determine an optical black (OB) value;

a second set of registers, the contents of which are usable by the circuitry within the AFE to identify data read from a vertically-extending shielded area of the image sensor; and a third set of registers, the contents of which are usable by the circuitry within the AFE to identify data read from a valid area of the image sensor, wherein the image sensor has a horizontally-extending edge and a vertically-extending edge, wherein the horizontally-extending shielded area extends between the valid area and the horizontally-extending edge, wherein the vertically-extending shielded area extends between the valid area and the vertically extending edge, wherein the OB value is used to adjust image data read from the valid area during the first full resolution readout for a first frame having a plurality of fields, and wherein the OB value is determined before a substantial amount of the image data is read from the valid area and remains unchanged throughout substantially the entire time of the first full resolution readout.

17. The AFE of claim 16, wherein the circuitry uses data read from the vertically-extending shielded area during a first full resolution readout to determine a second optical black (OB) value, and wherein the second OB value is used to adjust image data read from the valid area during a second full resolution readout for a second frame.

18. The AFE of claim 16, wherein the circuitry comprises:
   a digital accumulator having a digital input port and a digital output port;
   a digital filter having a digital input port that is coupled to the digital output port of the accumulator, the digital filter outputting the OB value;
   a shadow register that receives the OB value from the digital filter and stores the OB value; and
   a coordinator circuit that supplies a signal to the accumulator, the signal being indicative of a time when data from the horizontally-extending shielded area of the image sensor is present on the digital input port of the accumulator.

19. The AFE of claim 18, wherein the circuitry further comprises:
   a serial port usable to load the first set of registers, the second set of registers, and the third set of registers from a source external to the AFE.

20. The AFE of claim 16, wherein the horizontally-extending shielded area of the image sensor extends from the vertically-extending edge of the image sensor, across the image sensor, and to a second vertically-extending edge of the image sensor.

21. A method, comprising:
   (a) powering up an image sensor;
   (b) reading first sensor data out of the image sensor, wherein the first sensor data is from a horizontally-extending shielded area of the image sensor, wherein the image sensor has a horizontally-extending edge;
   (c) using the first sensor data to determine an optical black value (OB value);
   (d) reading second sensor data out of the image sensor, wherein the second sensor data is from a valid area of the image sensor, wherein the horizontally-extending shielded area is at least partially between the valid area and the horizontally-extending edge; and
   (e) using the OB value to modify the second sensor data to obtain optical black adjusted data (OBAD), wherein both the first sensor data and the second sensor data are from a single frame of image data having a plurality of fields, wherein the single frame of image data is the first frame of image data read out of the image sensor after the powering up of (a), and wherein the OB value is determined before a substantial amount of the second sensor data is read from the valid area of the image sensor and remains unchanged throughout substantially the entire time that the second sensor data for each of the plurality of fields is read out from the valid area of the image sensor.

22. The method of claim 21, wherein the first frame of image data is read out of the image sensor in a full-resolution readout mode.

23. The method of claim 22, wherein an integrated circuit (IC) reads the first and second sensor data out of the image sensor, wherein the IC determines the OB value in (c), wherein the IC uses the OB value in (e), and wherein the IC modifies the second sensor data in (e) while second sensor data is being read out of the image sensor in (d).

* * * * *